3,700,651
L-LEUCYL-L-LEUCYL-L-VALYL-L-TYROSINOL
Yuichi Yamamura, Toyonaka, Tatsuo Kokubu, Osaka, Keisuke Shigezane, Urawa, and Tomishige Mizoguchi, Yamato-machi, Japan, assignors to Tanabe Seiyaku Co., Ltd., Osaka, Japan
No Drawing. Filed July 7, 1970, Ser. No. 53,012
Claims priority, application Japan, July 15, 1969, 44/56,276
Int. Cl. C07c 103/52
U.S. Cl. 260—112.5      2 Claims

ABSTRACT OF THE DISCLOSURE

L-leucyl-L-leucyl-L-valyl-L-tyrosinol and its pharmaceutically acceptable acid addition salts have antihypertensive activity. An ester of L-leucyl-L-leucyl-L-valyl-L-tyrosine having a terminal-α-amino group which is either protected or unprotected is reduced. If the terminal α-amino group is protected, the protective group is then removed.

The present invention relates to a novel derivative of tyrosinol and to a process for preparing same. More particularly, it relates to L-leucyl-L-leucyl-L-valyl-L-tyrosinol represented by the formula:

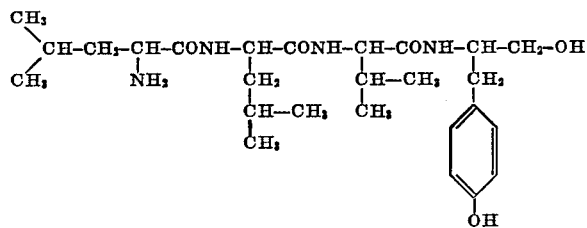

and pharmaceutically acceptable acid addition salts thereof.

We have found that L-leucyl-L-leucyl-L-valyl-L-tyrosinol and its acid addition salts are useful as an antihypertensive agent, particularly for the prevention of renal hypertension and as a diagnostic agent for renal hypertension. Namely, the tyrosinol compound or its salts inhibit the enzymatic action of renin (an enzyme secreted from the kidney) on angiotensinogen which is found in blood plasma. It has been reported that esters of L-leucyl-L-leucyl-L-valyl-L-tyrosine similarly inhibit the enzymatic action of reinin (Japanese Pat. No. 500,-830). However, it has been found that the above described tyrosinol compound and its salts have many more advantages than the above tetrapeptide esters. For example, the tyrosinol compound as well as its salts are characterized by their reduced toxicity and increased solubility in an aqueous solvent as compared with the corresponding properties of the tetrapeptide esters. Namely, when the tetrapeptide ester was administered intraperitoneally to Wistar male rats (body weight: about 200 g.) for 10 days at a dose of 100 mg./kg./day, such disorders as cloudy swelling of the liver, hypertrophy in the capsule of the liver and spleen, and peritonitis were found in almost all cases (9 out of 10 rats). On the other hand, no change was seen in the tissue of the liver and spleen of the rats when the tyrosinol compound of the present invention was administered intraperitoneally to the rats for 30 days at the same dose. As shown in Table 1, the solubility of the tyrosinol compounds is about two times greater than that of the tetrapeptide esters.

TABLE 1

| Compounds: | Solubility in water (percent) at 25° C. |
|---|---|
| L-leucyl-L-leucyl-L-valyl-L - tyrosinol (hydrochloride) | 3.06 |
| Ethyl L-leucyl-L-leucyl-L-valyl - L - tyrosinate (hydrochloride) | 1.65 |

When a dose of 50 mg. (about 3.3 mg./ml./min.) of the tyrosinol compound or the tetrapeptide ester is administered intravenously to a rabbit (body weight: 2.0 kg.) prior to the intravenous administration of renin at a dose of 0.1 ml., these compounds exhibit the corresponding inhibitory effect.

According to the present invention, the tyrosinol compounds of the present invention can be prepared by reducing an ester of L-leucyl-L-leucyl-L-valyl-L-tyrosine having a protected or an unprotected terminal α-amino group. If the resultant product has a protected terminal α-amino group, the protective group is then removed therefrom.

The tetrapeptide esters to be used as a starting compound can be prepared by any conventional method, for example, the method described in Japanese Pat. No. 500,-830. Suitable examples of the compounds are lower alkyl esters such as methyl, ethyl, and propyl esters. Other conventional esters can also be used. The terminal α-amino group of the tetrapeptide ester may be preferably protected with an acyl group, for example, a benzyloxycarbonyl group, a t-butoxycarbonyl group or a t-amyloxycarbonyl group.

The reduction of the esters can be carried out by conventional manner. For example, the ester may be treated with sodium borohydride in a suitable solvent. Examples of such a solvent include aqueous methanol, aqueous ethanol or the like. The preferred amount of sodium borohydride to be used is about 5 to 15 times, particularly 6–10 times, on a molar basis, the amount of the starting tetrapeptide ester. The reaction can be carried out over a wide range of temperature, for example, from 15 to 30° C. If the resultant tyrosinol compounds still have the protected terminal α-amino group, the tyrosinol compounds are further subjected to the removal of the protective group. The removal of the protective group may be carried out by an appropriate manner which is dependent upon the kind of protective group. Some typical procedures for this purpose are illustrated as follows: catalytic reduction (catalyst: e.g. palladium carbon) at room temperature under acid conditions or treatment with hydrogen bromide in acetic acid at room temperature for about an hour when a benzyloxycarbonyl group is employed as the protective group; treatment with hydrogen halide at room temperature or at an elevated temperature for 10 to 30 minutes when a t-butoxycarbonyl or a t-amyloxycarbonyl group is empolyed as the protective group.

L-leucyl-L-leucyl-L-valyl-L-tryosinol which is prepared by the method of the present invention can be readily converted into its pharmaceutically acceptable acid addition salt by a conventional method. Examples of such pharmaceutically acceptable acid addition salts are the hydrochloride, hydrobromide, nitrate, sulfate, phosphate, succinate, citrate, acetate, malonate, etc. The tyrosinol compound or its salts of the present invention may be administered to a patient in a conventional pharmaceutical dosage form such as a sterile injectable aqueous solution containing about 0.1 to 1.0% of the compound which is dependent upon the degree of the case.

Practical and presently-preferred embodiments of the present invention are shown in the following examples. These examples are given only for the purpose of illustrat-

EXAMPLE 1

A solution of 10.3 g. (18 millimole) of ethyl L-leucyl-L-leucyl-L-valyl-L-tyrosinate hydrochloride in 260 ml. of 50% ethanol is added dropwise to a solution of 6.81 g. (180 millimole) of sodium borohydride in 200 ml. of 50% ethanol. The addition is carried out for 45 minutes at 6–8° C. After stirring for 22 hours at room temperature, the solution is adjusted to pH 2.0 with 80 ml. of 10% hydrochloric acid under cooling. The solution is then adjusted to pH 6 with potassium carbonate and concentrated under reduced pressure. 200 ml. of water are added to the residue. The aqueous solution is adjusted to pH 10 with potassium carbonate and extracted with n-butanol. The extract is washed with water and dried. 9 ml. of 4N-dry hydrogen chloride-ethanol are added to the extract. The extract is concentrated under reduced pressure and the residue is recrystallized from a mixture of ethanol and ether. 7.58 g. of L-leucy-L-leucyl-L-valyl-L-tyrosinol hydrochloride are obtained (½ $C_2H_5OH$).

M.P. 242° C. (decomp.) $[\alpha]_D^{22}$—47.5 (C=0.74, 1=0.5, methanol). Yield: 76.3%.

EXAMPLE 2

A solution of 5.36 g. of (8 millimoles) of ethyl N-benzyloxycarbonyl-L-leucyl-L-leucyl L-valyl - L - tyrosine in 250 ml. of 80% ethanol is added to a solution of 1.82 g. (48 millimoles) of sodium borohydride in 125 ml. of 80% ethanol. The addition is carried out for 12 minutes at —5 to —2° C. A solution of 2.08 g. (48 millimoles) of lithium chloride in 105 ml. of 80% ethanol is added dropwise to the solution for 15 minutes at —3 to —2° C. After stirring for 18 hours at room temperature, the solution is adjusted to pH 2 with 10% hydrochloric acid under cooling. The solution is then adjusted to pH 6 with potassium carbonate and concentrated under reduced pressure. 200 ml. of water are added to the residue. The aqueous solution is extracted with ethyl acetate and the extract is washed with 10% hydrochloric acid, water, 1 M-potassium carbonate and water, successively. The solution is dried and evaporated to remove the solvent. 4.63 g. of crude crystals N-benzyloxycarbonyl-L-leucyl-L-leucyl-L-valyl-L-tyrosinol are obtained.

One g. of the crystals thus obtained is purified by column chromatography using silica gel [Solvent: chloroform-ethyl acetate-methanol (5–5–1)] and then recrystallized from a mixture of methanol and ethylacetate. 0.41 g. of N - benzyloxycarbonyl - L - leucyl-L-leucyl-L-valyl-L-tyrosinol is obtained, M.P. 201–203.5° C. $[\alpha]_D^{21}$—66.9° (C=1.11, 1=0.5, methanol).

A solution of 43 mg. (0.686 millimole) of the crystals in 15 ml. of ethanol is mixed with 0.1 ml. of 4.9 N dry hydrogen chloride-ethanol and 10 mg. of 10% palladium carbon. Hydrogen gas is introduced into the solution for 200 minutes at room temperature. After completion of the reaction, the catalyst is removed by filtration and the filtrate is concentrated under reduced pressure. The residue is washed with ether and dried. 32 mg. of L-leucyl-L-leucyl-L-valyl-L-tyrosinol hydrochloride is obtained. Yield: 84.9%.

The crystals are recrystallized from a mixture of ethanol and ethyl acetate. 22 mg. of crystals melting at 241.5–242° C. (decomp.) is obtained. $[\alpha]_D^{22}$—46.4° (C=0.345, 1=0.5, methanol).

The infrared absorption spectrum and thin layer chromatography of the crystals thus obtained are identical with those of the crystals obtained in Example 1.

What is claimed is:
1. L-leucyl-L-leucyl-L-valyl-L-tyrosinol or a pharmaceutically acceptable acid addition salt thereof.
2. The compound as described in claim 1, wherein said salt is a hydrohalide.

References Cited

FOREIGN PATENTS

| | | | |
|---|---|---|---|
| 422/821 | 2/1967 | Japan | 260—112.5 |
| 1,175,014 | 12/1969 | Great Britain | 260—112.5 |
| 2,003,019 | 8/1970 | German | 260—112.5 |

OTHER REFERENCES

Kokubu et al., Nature 217, 456–457 (1968).

Oelofson et al. J. Amer. Chem. Soc. 88, 4254–4260 (1966).

Seki et al., Chem. Pharm. Bull. (Tokyo) 13, 995–1000 (1965).

Brown et al., J. Org. Chem. 28, 3261–3263 (1963).

March, Advanced Organic Chemistry: Reactions, Mechanism and Structure, McGraw-Hill Book Co., New York (1968), pp. 890–897.

Kawamura et al., Chem. Pharm. Bull. (Tokyo) 17, 1902–1909 (1969).

LEWIS GOTTS, Primary Examiner

REGINALD J. SUYAT, Assistant Examiner

U.S. Cl. X.R.

424—177